United States Patent [19]
Ruff

[11] Patent Number: 4,998,417
[45] Date of Patent: Mar. 12, 1991

[54] ICEMAKER SYSTEM WITH WIDE RANGE CONDENSING TEMPERATURES

[75] Inventor: John D. Ruff, Alexandria, Va.
[73] Assignee: Thermadyne, Inc., Alexandria, Va.
[21] Appl. No.: 494,546
[22] Filed: Mar. 16, 1990

Related U.S. Application Data

[60] Continuation-in-part of Ser. No. 437,161, Nov. 16, 1989, Pat. No. 4,941,902, which is a division of Ser. No. 278,447, Dec. 1, 1988, Pat. No. 4,897,099.

[51] Int. Cl.$^5$ .............................................. C02F 1/22
[52] U.S. Cl. ............................ 62/532; 62/196.4; 62/225; 251/50
[58] Field of Search ............... 62/238.6, 123, 124, 62/532, 225, 196.4; 236/92 B; 251/50, 54

[56] References Cited

U.S. PATENT DOCUMENTS

| | | | |
|---|---|---|---|
| 2,579,334 | 12/1951 | Plank | 251/54 |
| 3,017,162 | 1/1962 | Haines et al. | 62/180 X |
| 3,488,974 | 1/1970 | Lunde et al. | 62/123 |
| 3,738,573 | 6/1973 | Eschbaugh et al. | 236/92 B |
| 3,926,008 | 12/1975 | Webber | 62/238.6 X |
| 4,262,489 | 4/1981 | Sakamoto | 62/124 |
| 4,535,603 | 8/1985 | Willitts et al. | 62/238.6 X |

Primary Examiner—William E. Tapolcai
Attorney, Agent, or Firm—Epstein, Edell & Retzer

[57] ABSTRACT

A refrigeration system having two alternatively actuable condensers operating at different condensing temperatures and pressures includes a compensatory metering arrangement for preventing significant changes of refrigerant fluid flow rate to the system evaporator when the system switches from one condenser to the other. Compensation is effected by changing the size of the metering orifice as necessary to accommodate the different condenser operating pressures. In one embodiment a thermostatic expansion valve is modified to include a damping factor preventing rapid changes in the valve position. Damping is achieved with a liquid-filled damping chamber having a damping diaphragm as one wall secured to the valve actuator rod. Opening of the valve requires the damping diaphragm to compress the liquid which is permitted to leak from the damping chamber at a controlled rate to slow the valve actuation rate. The system has particular utilization in the formation and collection of purified ice pieces from unpurified water and the formation of purified water by the selective melting of ice pieces using rejection heat from one of the alternatively operative condensers. In an alternative system embodiment, electrical heating of the collection bin is employed to melt ice pieces.

17 Claims, 3 Drawing Sheets 4,998,417

ICEMAKER SYSTEM WITH WIDE RANGE CONDENSING TEMPERATURES

CROSS-REFERENCE TO RELATED APPLICATIONS

This application is a continuation-in-part of my co-pending U.S. patent applications Ser. No. 07/437,161 filed Nov. 16, 1989, now U.S. Pat. No. 4,941,902, which is a divisional application of my prior U.S. patent application Ser. No. 07/278,447, filed Dec. 1, 1988, now U.S. Pat. No. 4,897,099.

Other related applications include my co-pending U.S. patent applications Ser. No. 07/471,884 and Ser. No. 07/471,885, both filed Jan. 29, 1990 as continuation-in-part applications of the aforesaid application Ser. No. 07/278,447.

The subject matter of all four of the aforesaid applications is expressly incorporated herein in its entirety.

BACKGROUND OF THE INVENTION

The present invention relates to a method and apparatus for controllably varying the flow rate and pressure of refrigerant fluid delivered to an evaporator in a refrigerant system of the type wherein two condensers operating at different temperatures and pressures are alternatively actuated. The invention has particular utility in systems of the type disclosed in my aforementioned prior patent applications wherein purified ice pieces are formed from tap water and then selectively melted to provide purified water.

In my aforesaid patent applications I disclose systems wherein heat to melt ice pieces is derived from a condenser employed in the ice-maker refrigeration cycle. Provision is made to maintain the condensing temperatures (and, therefore, the condensing pressures) at appropriately high levels while the condenser rejection heat is employed to melt the ice pieces. These high temperatures and pressures serve to maintain an adequate flow of refrigerant fluid through the metering device to the evaporator of the refrigeration system.

OBJECTS AND SUMMARY OF THE INVENTION

It is an object of the present invention to provide a method and apparatus for permitting the refrigerant condensing function to occur at relatively low temperatures in the ice-melting condenser while maintaining adequate flow through the refrigerant metering device to the evaporator.

In accordance with the present invention, condensing is permitted at relatively low temperatures by placing the melting condenser in direct contact with the bottom of the ice piece collection bin. Adequate refrigerant flow is maintained by utilization of unusually large metering orifices. The system is adaptable to higher condensing temperatures, at such time as when ice is not being melted by the condenser, by automatically decreasing the size of the metering orifice. When a lower condensing temperature is employed, less power is consumed by the refrigerant compressor which is no longer required to pump against the high discharge pressure present with higher condensing temperatures. In one embodiment of the invention, a wide range thermostatic expansion valve automatically adapts to the varying condensing temperatures to control the metering orifice size. The valve responds to the temperature of the refrigerant fluid to open and close the metering orifice accordingly. A damping mechanism is employed in the valve to limit its actuation rate at the onset of opening and closing to prevent overfeeding of refrigerant fluid to the evaporator immediately after changeover occurs from one condenser to the other.

An alternative ice-melting system is also disclosed wherein an electrical heater, rather than a second condenser is employed to melt ice. This embodiment is particularly useful to reduce construction costs for small capacity systems.

BRIEF DESCRIPTION OF THE DRAWINGS

The above and still further objects, features and advantages of the present invention will become apparent upon consideration of the following detailed description of specific embodiments thereof, especially when taken in conjunction with the accompanying drawings wherein like reference numerals in the various figures are utilized to designate like components, and wherein.

DESCRIPTION OF THE PREFERRED EMBODIMENTS

Figure 1:
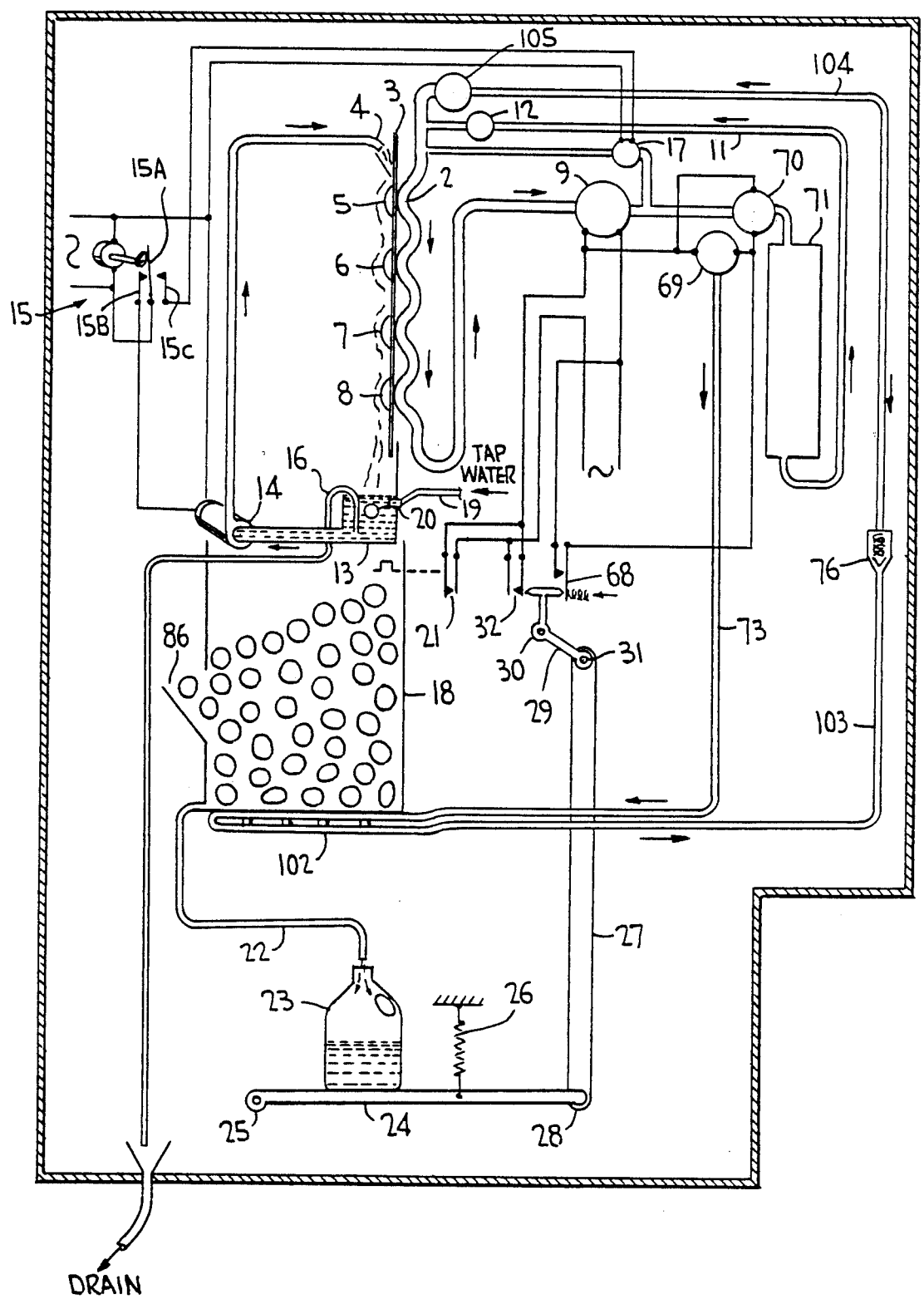
FIG. 1 is a schematic flow diagram of a system employing one embodiment of the present invention.

In order to facilitate reference to the disclosure material incorporated herein from my U.S. Pat. No. 4,897,099 and my other above-described patent applications, reference numerals up to and including numeral "86" appearing in the accompanying drawings are chosen to correspond to those reference numerals employed in the aforesaid patent to designate like elements. Higher reference numerals appearing in the accompanying drawings designate elements not present in the aforesaid patent.

Referring now to FIG. 1 of the accompanying drawings, an ice maker includes an evaporator tube 2 contacting the dry or control surface of a vertical ice-forming plate 3 at multiple spaced locations. For some applications a plurality of such plates may be employed. Unpurified water discharged as a jet or stream from nozzle 4 flows down along the wet or ice-forming surface of plate 3, whereby ice pieces 5, 6, 7 and 8 are formed at the spaced areas corresponding to the locations of contact between evaporator tube 2 and plate 3. Refrigerant vapor from evaporator 2 flows back to a compressor 9 where it is compressed and then directed to a condensing system described in detail below. Liquid refrigerant returning from the condensing system is conveyed by liquid line 11 to a metering device 12, typically an expansion valve, and then back to evaporator 2 in a conventional closed circuit refrigeration flow path. Excess water flowing over the growing ice pieces 5, 6, 7 and 8 carries away impurities before they can be trapped and then drains into sump 13. Water from sump 13 is drawn by pump 14 and pumped back to nozzle 4 to form a continuous circuit of unpurified water flow.

After a predetermined time has elapsed for ice pieces 5, 6, 7 and 8 to grow to adequate size, a harvest of the ice pieces is initiated. A cam 15A of a timer 15 actuates switch points 15B to break an electrical energizing circuit for pump 14. With pump 14 deactuated, water in transit from pump 14 to nozzle 4, and water flowing over the ice pieces 5, 6, 7 and 8, flows back to raise the level in sump 13. As a consequence, a siphon 16 is activated to dump the remainder of the water from sump 13 to a drain. Timer 15 simultaneously activates switch point 15B to deactivate pump 14 and switch point 15C to energize a hot gas valve 17, thereby allowing hot refrigerant gas to be shunted around the condenser system and expansion valve 12 to flow directly into evaporator 2. The warming effect of this hot gas detaches the ice pieces from plate 3, permitting them to fall into ice collection bin 18. Meanwhile, the water in sump 13 is replenished by tap water from pipe 19 under the control of a float valve 20. After a predetermined ice piece harvest interval, cam 15A of timer 15 reverses the settings of the switch points, de-energizes hot gas valve 17 and reactivates pump 14 so that ice making may be resumed. A repetitive cycle of harvest and ice making is thus continued until ice collection bin 18 is full, at which time the ice pieces come into contact with the ice quantity sensor of bin switch 21 which opens to cause compressor 9 to be deactuated. The ice pieces thusly collected, because they are continuously washed by the stream delivered from nozzle 4 as the pieces are being formed, have a much higher purity than that of the original tap water. The ice making apparatus thus far described is of a type commonly employed and well known. Similarly, any other type of ice maker using a recirculating flow of pumped water, and therefore capable of producing a supply of pure ice pieces, can be employed in connection with the present invention.

Any ice that melts in bin 18 drains through a pipe 22 having an inlet at the bottom of the bin. The drained water flows into a bottle 23 or other container resting on a platform 24 hinged at a positionally fixed point 25. By "positionally fixed" it is meant that the hinge or pivot point 25 is stationary relative to the common cabinet or housing for all of the components described herein. With container 23 full, its weight overcomes the resilient bias force of a balance spring 26 and pulls platform 24 clockwise (as viewed in the drawing) to swing the platform downward. This downward movement causes a downward movement of a control link 27 connected to platform 24 at a connecting pivot 28, the latter being movable relative to the common system housing. The opposite end of control link 27 is attached to a movable pivot point 31 which is attached to rocker arm 29. Downward movement of control link 27 causes clockwise rotation of rocker arm 29 about a positionally fixed pivot point 30. This clockwise rotation of rocker arm 29 holds switch 68 open. Electrical current flow to solenoid valves 69 and 70 is thus interrupted so that these valves remain de-energized. With bin switch 21 close, indicating that the bin is less than full of ice pieces, compressor 9 continue to run. Solenoid valve 70 is a normally open valve; therefore, since it is de-energized, valve 70 permits refrigerant fluid, discharged by compressor 9, to flow to condenser 71. Solenoid valve 69 is a normally closed valve; therefor, since it is de-energized, it is closed. Condenser 71 may be either air-cooled or water-cooled. Refrigerant liquid flows from condenser 71 to liquid line 11, then to metering device 12 and evaporator 2 in the ice-making function previously described.

If bottle 234 is less than full, its weight is overcome by the resilient bias force of balance spring 26 which pulls platform 24 counter-clockwise (as viewed in the drawing) to swing the platform upwardly. Upward movement of the platform causes an upward movement of control link 27 and a counter-clockwise rotation of rocker arm 29. In response to rotation of rocker arm 29, an override switch 32 closes, thereby bypassing bin switch 21 to permit compressor 9 to run regardless of the state of the bin switch. Counter-clockwise rotation of rocker arm 29 also permits switch 68 to close, thereby completing a circuit to energize both solenoid valves 69 and 70. When the normally open solenoid valve 70 is energized, it closes to shut off refrigerant flow to condenser 71. When the normally closed solenoid valve 69 is energized, it opens to allow flow of compressed refrigerant vapor through pipe 73 to condenser coil 102 secured in direct contact with the bottom of ice collection bin 18. Condenser coil 102 acts as a condenser rejecting heat of condensation to melt ice pieces in bin 18. Ice resting at the bottom of bin 18 is thereby melted at a relatively fast rate, and the resulting purified water is drained by a pipe 22 into container 23.

As ice melts at the bottom of pin 18, the weight of ice pieces in the bin causes more pieces to continually move downwardly to the bin bottom. Meanwhile, the ice-making function continues so that a supply of fresh ice pieces is collected in the bin. Condensed liquid refrigerant from condenser coil 102 flows through pipe 103 and check valve 76 to liquid line 104. Check valve 76 serves to block backflow into condenser coil 102 during system shut down. Liquid refrigerant flows in liquid line 104 to a second metering device 105, and then back to evaporator 2 in a continuous refrigeration circuit. Metering device 105 can be an expansion valve, capillary tube, or other type of throttling device, but it differs from metering device 12 in that its orifice, through which the liquid refrigerant passes, must be much larger or, in the case of an expansion valve, capable of opening to a much larger opening than provided in metering device 12. This is required because, when condenser coil 102 is functioning as the system condenser, the high-side pressure is quite low due to a low condensing temperature as compared to the higher pressure and temperature in condenser 71. Accordingly, with only the lower pressure available to propel refrigerant liquid through the metering device, the orifice or opening must be much larger if the same flow rate to the evaporator is to be maintained. With a typical refrigerant fluid such as refrigerant R-502, and with the evaporator operating at 20° F. and a low-side pressure of 53 psi, condenser coil 102 typically operates at 40° F. and has a high-side pressure of 80 psi. The resulting pressure differential is 27 psi. Condenser 71, on the other hand, typically operates at a 100° F. with a high-side pressure of 216 psi, providing a pressure differential of 163 psi.

When water container 23 become full, is weight once again overcomes the bias force of balance spring 26, causing platform 24 to drop (i.e., pivot clockwise about fixed pivot 25). Control link 27 is thereby pulled downwardly, rotating rocker arm 29 clockwise to open switch 68 and de-energize solenoid valves 69, 70 and terminating the ice-melting function. Override switch 32 also opens, leaving control of the ice making function to bin switch 21.

Figure 2:
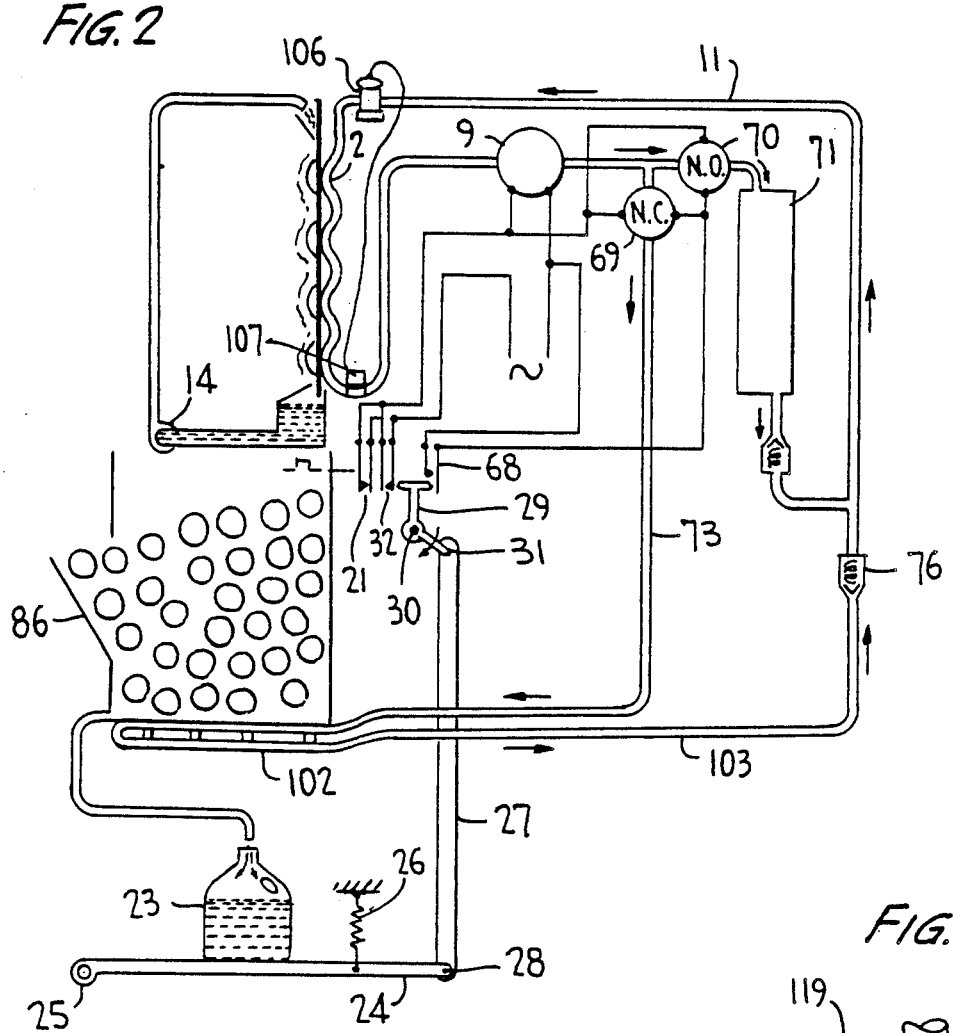
FIG. 2 is a schematic flow diagram of a system employing a second embodiment of the present invention.

Another embodiment of the invention is illustrated in FIG. 2 of the accompanying drawings to which reference is now made. The overall operation of this embodiment is identical to that described for the embodiment illustrated in FIG. 1 except that a single liquid line 11 and a single expansion valve 106 are employed rather than the two metering devices 12 and 105 and their associated liquid lines 11 and 104 (FIG. 1). An additional check valve 72 is also employed for this embodiment. Expansion valve 106 is capable of controlling a relatively constant flow of refrigerant liquid, regardless of the wide range of pressure differentials encountered between the high-side and the low-side pressures, when condenser coil 102 or condenser 71 are used alternatively as described above in connection with the embodiment illustrated in FIG. 1. Expansion valve 106 is a wide-range thermostatic expansion lave of the type described in detail below in relation to FIG. 3.

In the ice-making, non-melting mode of operation of the system illustrated in FIG. 2, refrigerant vapor from evaporator tube 2 is drawn by compressor 9, compressed and then discharged through valve 70 to condenser 71. Condensed liquid refrigerant flows through check valve 72, through liquid line 11, and then through expansion valve 106 to evaporator tube 2 in a conventional refrigeration cycle. As described above, the differential between the pressures in liquid line 11 and evaporator tube 2 is relatively large when condenser 71 is in operation. When the system is switched to an ice-making, ice-melting mode of operation, compressor 9 discharges the compressed vapor through valve 69 and pipe 73 to condenser coil 102. Condensed liquid refrigerant flows through pipe 103, check valve 76, liquid line 11 and expansion valve 106 to evaporator tube 2. The differential between the pressures in liquid line 11 and evaporator 2 is relatively small when condensing occurs at the lower temperature of condenser coil 102 (as previously described). Regardless of these disparate pressure differentials, expansion valve 106 allows only the appropriate amount of liquid refrigerant to flow into evaporator tube 2 in these alternative melting and non-melting modes of operation. Temperature bulb 107 senses the temperature of suction vapor leaving the evaporator 2. Check valves 72 and 76 prevent backflow into condensers 71 and 102, respectively, during their alternative functions and during system shut down.

Figure 3:
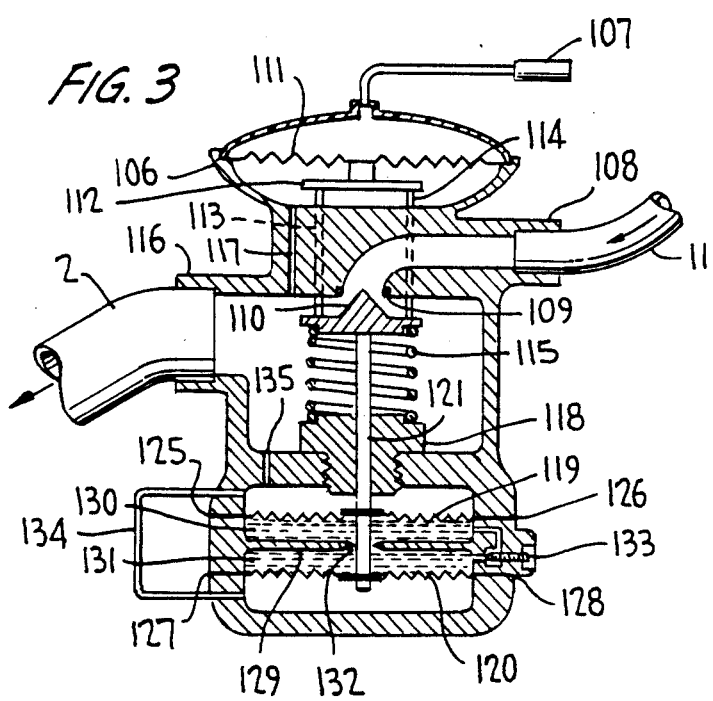
FIG. 3 is an elevation view in section of a valve of the present invention employed in the embodiment of FIG. 2.

Referring now to FIG. 3 of the accompanying drawings, expansion valve 106 essentially comprises an oversized thermostatic expansion valve with a damping mechanism for slowing down the rate of opening to: (a) prevent overfeeding of refrigerant fluid until the system is settled in balanced operation during starting of the system; and (b) prevent hunting. Liquid refrigerant from liquid line 11 enters inlet port 108 and flows to valve seat 109 which combines with valve head 110 to form the variable metering orifice of the valve. Power element diaphragm 111 responds to vapor pressure on its upper side from the refrigerant liquid charge in temperature bulb 107. (It is to be noted that use of such terms as "upper side", "underside", "upward", "downward", etc., relates only to orientations in FIG. 3 for simplified understanding and are not to be construed as preferred actual orientations of the valve and valve components). Downwardly mechanical pressure form diaphragm 111 is transferred via collar 112 and pushrods 113 and 114 to valve head 110, tending to move the valve head toward an open valve position. Control spring 115 provides a bias force in the opposite direction. Outlet port 116 connects directly to evaporator tube 2. The vapor pressure present in the evaporator is present on the underside of diaphragm 111 by virtue of passage 117 connecting the space under diaphragm 111 to the valve body interior in the region of outlet port 116. The extent of movement of valve head 110 away from valve seat 109, and thus the extent of valve opening or orifice size, depends upon the combined effects of: (1) downward pressure on diaphragm 111 as a function of the temperature sensed by bulb 107; (2) upward pressure on diaphragm 111 as a function of evaporator pressure; and (3) upward force from bias spring 115. Adjustable collar 118 has a male screw thread engaging a female screw thread in the body. The tension on control spring 115 can be altered by rotation of collar 118, thus allowing superheat adjustments to be made.

The operation of valve 106 as thus far described is the same as the operation of a conventional thermostatic expansion valve, except that the essential elements of valve 106, such as diaphragm 111, valve seat 109, valve heat 110 and bias spring 115 are larger than would be employed in a conventional refrigeration system of corresponding tonnage. This is necessarily so because valve 106, when employed with low temperature condenser coil 102 (FIG. 2), must permit flow of the required quantity of liquid refrigerant for that tonnage, but must have a pressure differential between its inlet and outlet that is much lower than normal. However, when valve 106 is employed with the normal temperature condenser 71, its larger sizing causes problems such as overfeeding of refrigerant fluid when the system is starting up, and hunting when overfeed is followed abruptly by starving, then overfeed, etc., in a repetitive cycle of over-compensation. In order to prevent this, a damping arrangement is provided and includes annular damper diaphragms 119 and 120. Alternatively, metal bellows may be employed instead of the diaphragms 119 and 120. Valve head 110 is attached to valve stem 121 so that any downward movement of the valve head 110, corresponding to opening of the valve orifice, is accompanied by movement of stem 121. Valve stem 121 is attached to the centers of damper diaphragms 119 and 120 by connections that are sealed to hold against fluid pressure, such that the movable center sections of these diaphragms move upward and downward with like movements of valve head 110. The stationary outer sections of damper diaphragms 119 and 120 are clamped to the valve body at points 125, 126, 127 and 128.

The valve body includes an annular wall 129 located in the space between the diaphragms 119 and 120 and subdividing the space to form an upper damping chamber 130 and a lower damping chamber 131. Chambers 130 and 131 are filled with a stable liquid such as refrigeration oil. An O-ring 132 seals an aperture provided in wall 129 about stem 121 and permits the stem to freely move upward and downward. Transfer of liquid between the upper and lower chambers 130 and 131 is provided by an adjustable orifice 133. Equalizer tube 134 and passage 135 allow the dry sides of damper diaphragms 119 and 120 to be maintained at the pressure existing in evaporator 2.

In operation, with the system at rest, and with temperatures and pressures equalized between evaporator tube 2 and temperature bulb 107, the power element diaphragm 111 is relaxed. Accordingly, control spring 115 maintains valve head 110 in the closed position.

When the compressor begins operation, pressure is reduced in evaporator tube 2 and, therefore, at the underside of power element diaphragm 111. This causes valve head 110 to tend to move downward to open the valve. However, such movement is resisted by damper diaphragms 119 and 120. Diaphragm 119 cannot move freely because of the liquid trapped beneath it, and diaphragm 120 is held by vapor pressure on its underside and vacuum on its upper side. However, orifice 133 slowly conducts fluid from upper chamber 130 to lower chamber 131, thereby enabling a slow movement of the damper diaphragms 119, 120 to provide a slow and controlled opening of the valve. The rate of valve opening can, of course, be adjusted by appropriately setting adjustable orifice 133. Assuming operation with the low temperature condenser tube 102, as the valve slowly opens, there is a tendency for the system to become starved for refrigerant. This does not present a real problem, only a lower than normal evaporator pressure for a very short time. When valve 106 reaches an orifice size consistent with its superheat setting, pressures and forces equalize and the valve orifice size remains constant. As the system settles down, and as minor changes occur in operating conditions, the valve adapts its orifice size to maintain constant superheat in the evaporator, but these changes occur slowly so that hunting is avoided. The closing of valve 106 is initiated if the temperature at bulb 107 is reduced or if the pressure in evaporator tube 2 is increased. In either case, the damping process is reversed and liquid from the lower chamber 131 is transferred to upper chamber 130. The time required for valve 106 to proceed from its fully open position to its fully closed position, or from its fully closed position to its fully open position, may range from ten seconds to several minutes. With a wide range expansion valve such as valve 106, actual superheating is greater at large orifice openings than at small orifice openings because of the increases in force applied by bias spring 115 as it is compressed. This difference can be minimized by the use of a longer than normal control spring. Such springs have less pressure variation throughout their movement range.

Figure 4:
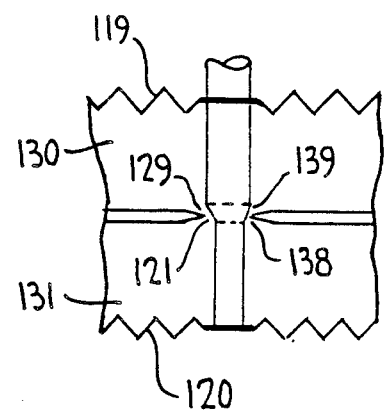
FIG. 4 is a view of a modified portion of the valve of FIG. 3.

An alternative improvement of valve 106 is illustrated in FIG. 4 wherein valve stem 121 is contoured to serve as a metering pin as it moves through the aperture in wall 129. O-ring 132 and adjustable orifice 133 are omitted, and the varying clearance between valve stem 121 and the aperture in wall 129 provides the path for liquid transfer between chambers 130 and 131. A tapered profile is provided on valve stem 121 so that the diameter at its bottom section 138 is smaller than the diameter at its top section 139. Small bottom section 138 is aligned with wall 129 (as shown in FIG. 4) when valve 106 is in its completely closed position. The additional clearance at this position results in a rapid initial rate of opening of valve 106, up to a small orifice size, thereby reducing the tendency of the system to starve for refrigerant during system start up operation. Then, as valve 106 continues to open, but while still at a relatively small orifice size, larger section 139 becomes aligned with wall 129, reducing the clearance and, therefore, the rate of opening. By this method, valve opening and closing rates at the smaller orifice sizes are relatively fast while opening and closing rates at the larger orifice sizes are relatively slow. Alternatively, the profile on valve stem 121 may be constructed in such form to control valve modulation rates in any desired manner. For example, valve stem 121 may have a straight parallel profile so that the opening rate is constant, in which case the clearance between valve stem 121 and wall 129 is a simple, non-adjustable substitute for adjustable orifice 133.

An alternative embodiment for expansion valve 106 is a conventional electrical expansion valve. Such valves are motorized metering devices with refrigerant liquid flow controlled by an electronic microprocessor responsive to sensors monitoring system conditions. Such devices are well-known.

If the advantages of a damped expansion valve, such as the embodiment described in relation to FIGS. 3 and 4, are required in an application where a wide range of pressure differentials are not encountered, the damping system described herein can be applied to any conventional valve of a size suitable for the tonnage of the system employed. Metering device 12, as illustrated in FIG. 1, is representative of such an application.

Figure 5:
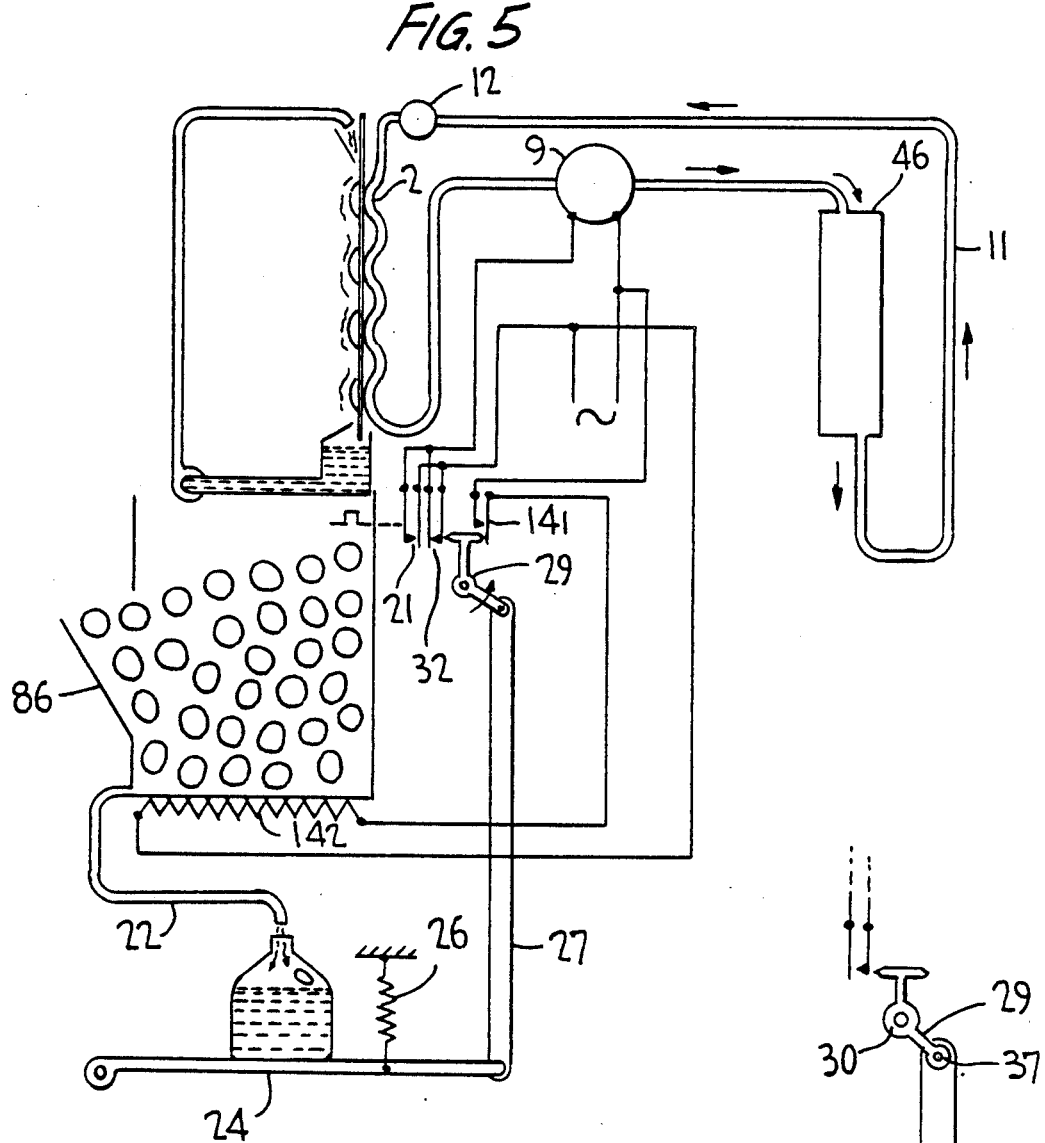
FIG. 5 is a schematic flow diagram of still another ice making and ice melting system according to the present invention.

A simplified ice-melting arrangement of the present invention is illustrated in FIG. 5 to which specific reference is now made. Compressor 9 draws refrigerant vapor from evaporator tube 2 and compresses and discharges it to condenser 46 which may be either air-cooled or water-cooled. Refrigerant liquid flows from condenser 46 through a liquid line 11 to metering device 12 and then to evaporator tube 2 in a conventional refrigeration cycle as part of an ice-making function similar to such functions described above in relation to other embodiments. Ice collection bin 18 contains the ice produced in this ice-making function. In the same manner described in relation to FIG. 1, when water container 23 is less than full, platform 24 is drawn upward by balance spring 26, thereby pushing upward on control link 27 and causing rocker arm 29 to rotate counter-clockwise. In this embodiment, the counter-clockwise rotation of rocker arm 29 allows an electrical switch 141 to close, causing electrical current to flow through switch 141 and energize an electrical heating element 142 attached to the bottom of bin 18. Heat produced by element 142 warms the bottom of bin 18, thereby melting some of the ice within the bin. Water from the melting ice flows via pipe 22 to container 23. When container 23 is full, its weight overcomes balance spring 26 causing platform 24 to swing downward, thereby moving control link 27 downward and causing rocker arm 29 to rotate clockwise. This rotation of rocker arm 29 forces switch 141 to open, de-energizing heating element 142 and terminating the ice-melting function. The ice-making function is normally controlled by pin switch 21 as previously described in relation to other embodiments, and when the ice-melting function is operating, override switch 32 causes the compressor 9 to run continuously so that ice is produced to replace the ice melted during the ice-melting function. This embodiment is less energy efficient than those employing non-electric sources of heat for ice-melting. However, low construction costs can outweigh the additional operational cost of electrical power for ice-melting, particularly with small capacitor systems. Such systems consume a minimal amount of energy when only a small amount of purified water is required.

Figure 6:
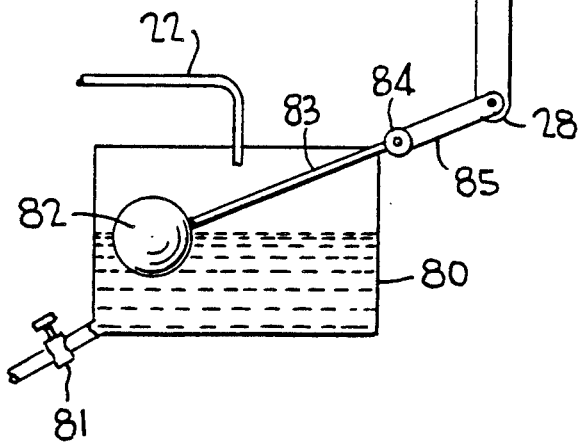
FIG. 6 is a view of an alternative actuating mechanism for terminating the ice melting function in response to accumulated purified water level, which arrangement may be employed in connection with any of the system embodiments disclosed herein.

A typical procedure for handling the recovered pure water is to employ a one gallon water bottle 23 (FIG. 1) positioned inside the cabinet on platform 24. An alternative water storage arrangement (see FIG. 6) employs a water tank 80 mounted permanently inside the cabinet with a float 82 detecting the level of water within. Float 82 is suspended from arm 83 secured at one side of fixed pivot point 84, the other side of which is connected to the actuator link 27 via connecting arm 85. Movement of float 82 is a substitute function for movement of platform 24 in the embodiment illustrated in FIG. 1.

In addition to the utilization of the present invention for the production of purified water, as described above, ice pieces may be removed from bin 18 for other purposes via bin door 86. These arrangements are described in detail in my aforementioned U.S. Pat. No. 4,897,099.

Having described preferred embodiments of a new and improved ice maker system with wide range condensing temperatures, constructed in accordance with the present invention, it is believed that other modifications, variations and changes will be suggested to those skilled in the art in view of the teachings set forth herein. It is therefore to be understood that all such variations, modifications and changes are believed to fall within the scope of the present invention as defined in the appended claims.

What is claimed is:

1. In a refrigeration system wherein refrigerant fluid flows through a closed flow path having a compressor, condenser means, evaporator means and metering means for delivering the refrigerant fluid to said evaporator means from said condenser means, and wherein said condenser means comprises at least first and second alternatively active condensers, said first condenser operating at relatively high condensing temperatures and pressures, said second condenser operating at relatively low condensing temperatures and pressures, apparatus for compensating for the different condensing pressures so as not to significantly change the refrigerant fluid flow rate to said evaporator means, said apparatus comprising:
    first means responsive to actuation of said first condenser for providing a relatively small metering orifice at said metering means; and
    second means responsive to said second condenser becoming active for providing a relatively large metering orifice at said metering means;
    wherein said metering means comprises a thermostatic expansion valve comprising:
    a valve body;
    a power diaphragm defining actuation chambers in said valve body;
    a fluid inlet opening;
    a fluid outlet opening;
    a fluid passage including said metering orifice interconnecting said fluid inlet and outlet opening;
    control means responsive to the pressures in said actuation chambers for varying the size of said metering orifice, said control means including an actuator mechanically linked to said power diaphragm, the position of said actuator determining the size of said metering orifice; and
    damping means for slowing the rate of movement of said actuator to prevent sudden changes in the size of said metering orifice;
    wherein said damping means comprises:
    a damping diaphragm secured to said actuator and disposed in said valve body to define a damping chamber, said damping diaphragm being secured to and movable with said actuator;
    damping liquid filling said damping chamber to resist movement of said damping diaphragm; and
    a leakage passage responsive to pressurization of said damping liquid in said chamber by said damping diaphragm for permitting some of said damping liquid to be forced from said damping chamber to thereby permit corresponding movement of said damping diaphragm;
    and further comprising:
    a second damping diaphragm secured to said actuator and disposed in said valve body to define a further chamber, said second damping diaphragm being secured to and movable with said actuator;
    a common wall of said valve body disposed between said first and second damping diaphragms to partially define said first and second damping chambers, said common wall having an aperture defined therethrough;
    wherein said actuator is a rod movably extending through said aperture in said common wall and secured to each of said first and second damping diaphragms;
    wherein said second damping chamber is filled with said damping liquid; and
    wherein said leakage passage extends between said first and second damping chambers.

2. The apparatus according to claim 1 wherein said leakage passage is defined by annular space between said aperture in said common wall and said actuator rod, said actuator rod having a longitudinal section proximate said aperture that is contoured to change the size of said annular space as a function of the longitudinal position of said actuator rod relative to said aperture.

3. A thermostatic expansion metering valve having an adjustable metering orifice comprising:
    a valve body;
    a power diaphragm defining first and second actuation chambers in said valve body;
    a fluid inlet opening;
    a fluid outlet opening;
    a fluid passage including said metering orifice interconnecting said fluid inlet and outlet openings;
    control means responsive to the pressures in said first and second actuation chambers for varying the size of said metering orifice, said control means including an actuator mechanically linked to said power diaphragm, the position of said actuator determining the size of said metering orifice; and
    damping means for slowing the rate of movement of said actuator to prevent sudden changes in the size of said metering orifice;
    wherein said damping means comprises:
    a damping diaphragm secured to said actuator and disposed in said valve body to define a damping chamber, said damping diaphragm being secured to and movable with said actuator;
    damping liquid filling said damping chamber to resist movement of said damping diaphragm; and
    a leakage passage responsive to pressurization of said damping liquid in said chamber by said damping diaphragm for permitting some of said damping liquid to be forced from said damping chamber to thereby permit corresponding movement of said damping diaphragm;
    and further comprising:
    a second damping diaphragm secured to said actuator and disposed in said valve body to define a further chamber, said second damping diaphragm being secured to and movable with said actuator;

a common wall of said valve body disposed between said first and second damping diaphragms to partially define said first and second damping chambers, said common wall having an aperture defined therethrough;

wherein said actuator is a rod movably extending through said aperture in said common wall and secured to each of said first and second damping diaphragms;

wherein said second damping chamber is filled with said damping liquid; and wherein said leakage passage extends between said first and second damping chambers.

4. The apparatus according to claim 3 wherein said leakage passage is defined by annular space between said aperture in said common wall and said actuator rod, said actuator rod having a longitudinal section proximate said aperture that is contoured to change the size of said annular space as a function of the longitudinal position of said actuator rod relative to said aperture.

5. In a system for providing purified ice pieces from a source of unpurified water, collecting the ice pieces in a bin, and providing purified liquid water by selectively melting some of the ice pieces, wherein ice is formed with the aid of evaporator means in a continuous flow path for refrigerant fluid, the flow path additionally including a compressor, condenser means and metering means for delivering refrigeration fluid to the evaporator means, a method for melting some of said ice pieces comprising the steps of:

(a) sub-dividing said condenser means into first and second alternatively actuable condensers in said refrigerant flow path;

(b) actuating said second condenser in an ice-making, ice-melting mode of system operation, and actuating said first condenser in an ice-making, non-melting mode of system operation;

(c) maintaining a low condensing temperature in said second condenser while utilizing the rejected heat from said second condenser to melt ice in said bin at a temperature of approximately 32° F.;

(d) maintaining a condensing temperature in said first condenser higher than the condensing temperature in said second condenser while disbursing rejected heat from said first condenser; and (e) compensating in said metering means for differing condensing temperatures in said first and second condensers; wherein step (e) includes the steps of:

(e.1) in said ice-making, ice-melting mode, providing a relatively large metering orifice at said metering means; and (e.2) in said ice-making, non-melting mode, providing a relatively small metering orifice at said metering means;

(f) collecting in a container said purified liquid water obtained by melting some of said ice pieces in step (c);

(g) sensing the amount of collected ice in said bin;

(h) sensing the amount of collected liquid water in said container;

(i) in response to both the amount of said collected ice in said bin exceeding a first predetermined amount, and the amount of said collected purified liquid water in said container exceeding a second predetermined amount, de-energizing said compressor;

(j) following step (i), re-energizing said compressor whenever either or both of the following occurs:

(1) the amount of collected ice in said bin falls below the first predetermined amount; and (2) the amount of collected purified liquid water in said container falls below the second predetermined amount; and wherein step (j) includes the steps of:

(j.1) in response to the amount of collected purified liquid water in said container being less than said second predetermined amount, actuating said second condenser; and (j.2) in response to the amount of collected purified liquid water in said container exceeding said second predetermined amount, actuating said first condenser.

6. The method according to claim 5 wherein said step (e.2) comprises flowing refrigerant fluid delivered to said first condenser through a first flow path containing said relatively small metering orifice and connected between said first condenser and said evaporator means; and wherein step (e.1) comprises flowing refrigerant fluid delivered by said second condenser through a second flow path containing said relatively large metering orifice and connected between said second condenser and said evaporator means.

7. The method according to claim 5 wherein said metering means comprises a valve having an adjustable metering orifice, and wherein:

step (e.2) comprises establishing a relatively restricted opening of said adjustable metering orifice to correspond to said small metering orifice when said first condenser is active; and step (e.1) comprises opening said adjustable metering orifice to correspond to said large metering orifice when said second condenser is active.

8. The method according to claim 7 further comprising the step of:

(k) sensing the pressure of refrigerant vapor in said evaporator means and the temperature of refrigerant vapor flowing from said evaporator means to said compressor; and wherein steps (e.1) and (e.2) comprise closing and opening said adjustable metering orifice in response to the refrigerant vapor pressure and temperature sensed in step (k).

9. The method according to claim 8 further comprising the steps of:

(l) in the range of relatively small openings of said adjustable metering orifice, providing a relatively fast rate of opening and closing of said adjustable metering orifice during actuation of said valve; and (m) in the range of relatively large sizes of said adjustable metering orifices, slowing the rate of opening and closing said valve during actuation of said valve.

10. The method according to claim 8 further comprising the step of damping the rate of said closing and opening said adjustable metering orifice to prevent sudden changes of refrigerant flow rates to said evaporator means.

11. In a system for providing purified ice pieces from a source of unpurified water, collecting the ice pieces in a bin, and providing purified liquid water by selectively melting some of the ice pieces in said bin, and wherein the ice is formed with the aid of an evaporator disposed in a continuous flow path for refrigerant fluid, the flow path additionally including a compressor, condenser means and metering means for delivering refrigerant fluid to said evaporator means, the improvement comprising:

first and second condensers corresponding to said condenser means;

means for selectively and alternatively actuating said first and second condensers in respective non-melting and ice-melting modes of operation;

means for utilizing rejected heat from said second condenser to melt ice in said bin at a temperature of approximately 32° F.;

means for maintaining condensing temperatures and pressures in said first condenser higher than the condensing temperatures and pressures in said second condenser;

metering means for compensating for the different condensing pressures so as not to significantly change the refrigerant fluid flow rate to said evaporator means, said metering means comprising:

first means responsive to actuation of said first condenser for providing a relatively small metering orifice at said metering means; and second means responsive to said second condenser becoming active for providing a relatively large metering orifice at said metering means;

container means for collecting the purified liquid water formed by melting the ice in said bin;

bin sensor means for sensing the amount of ice collected in said bin;

container sensor means for sensing the amount of purified liquid water collected in said container;

control means responsive to both said bin sensor means and said container sensor means for de-energizing said compressor when the amount of said collected ice in said bin exceeds a first predetermined amount and the amount of said collected purified liquid water in said container exceeds a second predetermined amount, said control means further including means for re-energizing said compressor in response to either or both of the following conditions: (1) the amount of collected ice in said bin falling below the first predetermined amount; and (2) the amount of collected purified liquid water in said container falling below the second predetermined amount;

wherein said control means further includes:

means responsive to the amount of collected purified liquid in said container being less than said second predetermined amount for actuating said second condenser and;

means responsive to the amount of collected purified liquid in said container exceeding said second predetermined amount for actuating said first condenser.

12. The apparatus according to claim 11 wherein said first means comprises a first flow path extending from said first condenser to said evaporator means and including said relatively small metering orifice; and wherein said second means comprises a second flow path extending from said second condenser to said evaporator means and including said relatively large metering orifice.

13. The apparatus according to claim 11 wherein said metering means comprises valve means having an adjustable metering orifice and metering control means for closing said adjustable metering orifice to provide said relatively small metering orifice when said first condenser is active and for opening said adjustable metering orifice to provide said relatively large metering orifice when said second condenser is active.

14. The apparatus according to claim 13 wherein said metering control means comprises:

sensor means for sensing the pressure of refrigerant vapor in said evaporator means and the temperature of refrigerant vapor flowing from said evaporator means to said compressor;

means responsive to increasing refrigerant vapor temperature and decreasing refrigerant vapor pressure for increasing the size of said adjustable metering orifice; and means responsive to decreasing refrigerant vapor temperature and increasing refrigerant vapor pressure for decreasing the size of said adjustable metering orifice.

15. The apparatus according to claim 14 further comprising damping means for slowing the rate of opening and closing said adjustable metering orifice.

16. The apparatus according to claim 11 wherein said metering means comprises a thermostatic expansion valve comprising:

a valve body;

a power diaphragm defining actuation chambers in said valve body;

a fluid inlet opening;

a fluid outlet opening;

a fluid passage including said metering orifice interconnecting said fluid inlet and outlet openings;

control means responsive to the pressures in said actuation chambers for varying the size of said metering orifice, said control means including an actuator mechanically linked to said power diaphragm, the position of said actuator determining the size of said metering orifice; and damping means for slowing the rate of movement of said actuator to prevent sudden changes in the size of said metering orifice.

17. The apparatus according to claim 16 wherein said damping means comprises:

a damping diaphragm secured to said actuator and disposed in said valve body to define a damping chamber, said damping diaphragm being secured to and movable with said actuator;

damping liquid filling said damping chamber to resist movement of said damping diaphragm; and a leakage passage responsive to pressurization of said damping liquid in said chamber by said damping diaphragm for permitting some of said damping liquid to be forced from said damping chamber to thereby permit corresponding movement of said damping diaphragm.

* * * * *